(12) United States Patent
Minachi et al.

(10) Patent No.: US 7,879,469 B2
(45) Date of Patent: Feb. 1, 2011

(54) FERRITE MAGNET POWDER, SINTERED MAGNET, BOND MAGNET, AND MAGNETIC RECORDING MEDIUM

(75) Inventors: Yoshihiko Minachi, Tokyo (JP); Noboru Ito, Tokyo (JP)

(73) Assignee: TDK Corporation (JP)

( * ) Notice: Subject to any disclaimer, the term of this patent is extended or adjusted under 35 U.S.C. 154(b) by 833 days.

(21) Appl. No.: 10/538,485

(22) PCT Filed: Feb. 5, 2004

(86) PCT No.: PCT/JP2004/001207

§ 371 (c)(1), (2), (4) Date: Mar. 17, 2006

(87) PCT Pub. No.: WO2004/077458

PCT Pub. Date: Sep. 10, 2004

(65) Prior Publication Data

US 2006/0172151 A1 Aug. 3, 2006

(30) Foreign Application Priority Data

Feb. 25, 2003 (JP) .............................. 2003-047857

(51) Int. Cl.
*G11B 5/65* (2006.01)
(52) U.S. Cl. ............... 428/836.2; 252/62.63; 252/62.62
(58) Field of Classification Search ...... 428/800–848.9, 428/836.2; 252/62.63
See application file for complete search history.

(56) References Cited

U.S. PATENT DOCUMENTS

| 4,397,796 A | 8/1983 | Lotgering |
| 5,866,028 A | 2/1999 | Toyota |
| 6,258,290 B1 * | 7/2001 | Taguchi et al. ........... 252/62.59 |

FOREIGN PATENT DOCUMENTS

| JP | 02102506 A | 4/1990 |
| JP | 02102507 A | 4/1990 |
| JP | 02-180004 | 7/1990 |
| JP | 08-119634 | 5/1996 |
| JP | 09-260124 | 10/1997 |
| JP | 2000-311811 | 11/2000 |
| JP | 2001-093716 | 4/2001 |
| WO | 9615078 A1 | 5/1996 |

OTHER PUBLICATIONS

English Translation of JP 02180004 A (PTO 09-1223) Jul. 12, 1990.*
Yamamoto et al. "Magnetic Properties of Ba-Zn-System W-Type Hexagonal Ferrite Magnets" IEEE Journal on Magenetic, vol. 8, No. 11, Nov. 1993 (Japan) pp. 763-769.

* cited by examiner

*Primary Examiner*—Holly Rickman
*Assistant Examiner*—Linda Chau
(74) *Attorney, Agent, or Firm*—Adli Law Group P.C.; Dariush G. Adli

(57) ABSTRACT

A ferrite magnet powder is represented by the composition formula $AFe^{2+}_{a(1-x)}M_{ax}Fe^{3+}_{b}O_{27}$, wherein A represents at least one element selected from the group consisting of Sr, Ba, and Pb; and M represents at least one element selected from the group consisting of Zn, Co, Mn, and Ni, and wherein $0.05 \leq x \leq 0.80$, $1.5 \leq a \leq 2.2$, and $12 \leq b \leq 17$. A high saturation magnetization $4\pi Is$ can be achieved by the partial substitution of the $Fe^{2+}$ site of a W-type ferrite with an element M such as Zn within a certain range.

17 Claims, 10 Drawing Sheets

| SAMPLE NO. | ELEMENT M | x | a | b | 4πIs (G) | Br (G) | SQUARENESS (%) | DENSITY (%) | MAGNETIC ORIENTATION (%) |
|---|---|---|---|---|---|---|---|---|---|
| 1 | NONE | 0 | 2.01 | 16.1 | 4980 | 4522 | 92.79 | 94.7 | 95.84 |
| 2 | Zn | 0.062 | 2.02 | 16.1 | 5140 | 4661 | 91.89 | 94.7 | 95.71 |
| 3 | Zn | 0.13 | 1.99 | 15.8 | 5233 | 4742 | 90.10 | 94.8 | 95.62 |
| 4 | Zn | 0.26 | 1.98 | 16.2 | 5353 | 4837 | 90.30 | 94.7 | 95.36 |
| 5 | Zn | 0.37 | 2.01 | 16.0 | 5446 | 4898 | 90.09 | 94.3 | 95.42 |
| 6 | Zn | 0.51 | 1.98 | 15.8 | 5502 | 4864 | 91.20 | 94.0 | 94.09 |
| 7 | Zn | 0.63 | 2.01 | 15.9 | 5440 | 4782 | 91.91 | 93.6 | 93.94 |
| 8 | Zn | 0.74 | 2.00 | 16.1 | 5283 | 4565 | 90.01 | 93.1 | 92.86 |

Figure 2

| SAMPLE NO. | ELEMENT M | x | a | b | 4πIs (G) | Br (G) | SQUARENESS (%) | DENSITY (%) | MAGNETIC ORIENTATION (%) |
|---|---|---|---|---|---|---|---|---|---|
| 1 | NONE | 0 | 2.01 | 16.1 | 4980 | 4522 | 92.79 | 94.7 | 95.84 |
| 2 | Zn | 0.062 | 2.02 | 16.1 | 5140 | 4661 | 91.89 | 94.7 | 95.71 |
| 3 | | 0.13 | 1.99 | 15.8 | 5233 | 4742 | 90.10 | 94.8 | 95.62 |
| 4 | | 0.26 | 1.98 | 16.2 | 5353 | 4837 | 90.30 | 94.7 | 95.36 |
| 5 | | 0.37 | 2.01 | 16.0 | 5446 | 4898 | 90.09 | 94.3 | 95.42 |
| 6 | | 0.51 | 1.98 | 15.8 | 5502 | 4864 | 91.20 | 94.0 | 94.09 |
| 7 | | 0.63 | 2.01 | 15.9 | 5440 | 4782 | 91.91 | 93.6 | 93.94 |
| 8 | | 0.74 | 2.00 | 16.1 | 5283 | 4565 | 90.01 | 93.1 | 92.86 |

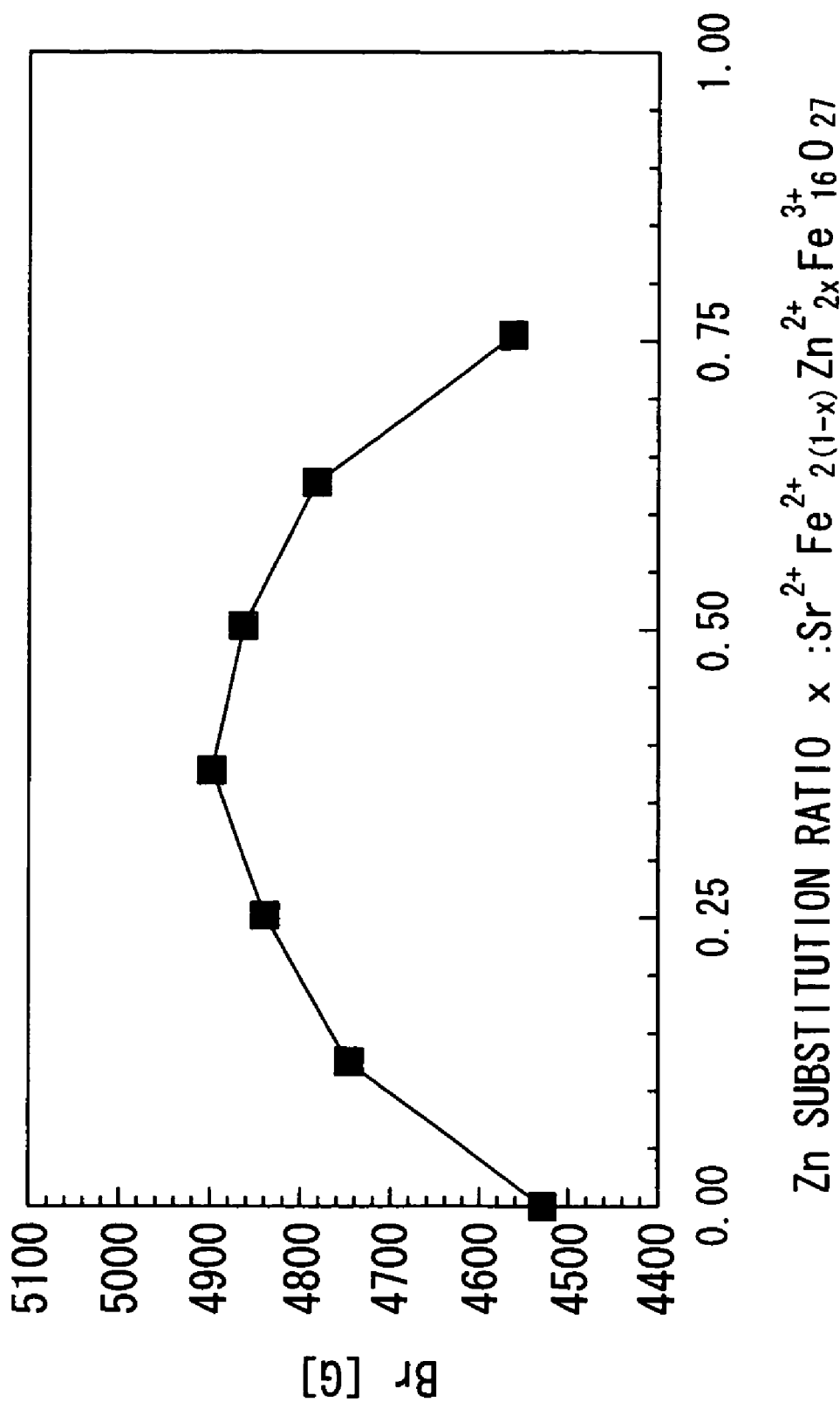

Figure 7

| SAMPLE NO. | x | AMOUNT OF $Fe^{3+}$ (AMOUNT OF $FeO_{1.5}$) | AMOUNT OF $Fe^{2+}$ (AMOUNT OF FeO) | SrO | ZnO |
|---|---|---|---|---|---|
| 1 | 0 | 16.1 | 1.89 | 1 | 0 |
| 4 | 0.26 | 16.2 | 1.47 | 1 | 0.51 |

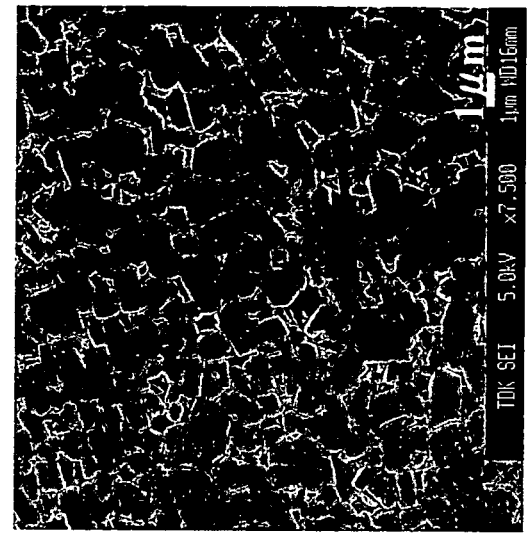
Figure 8C  Sample No. 8 (x=0.74)
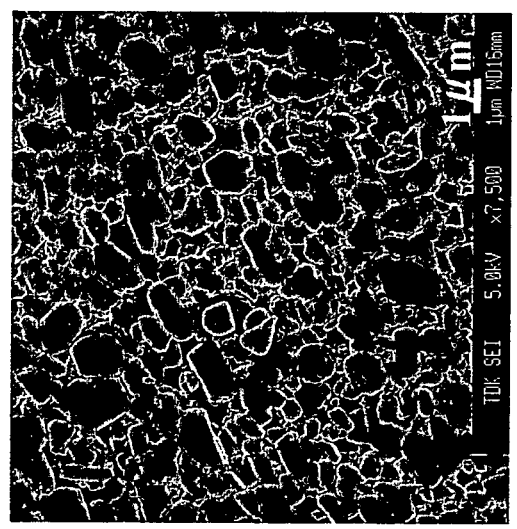
Figure 8B  Sample No. 6 (x=0.51)
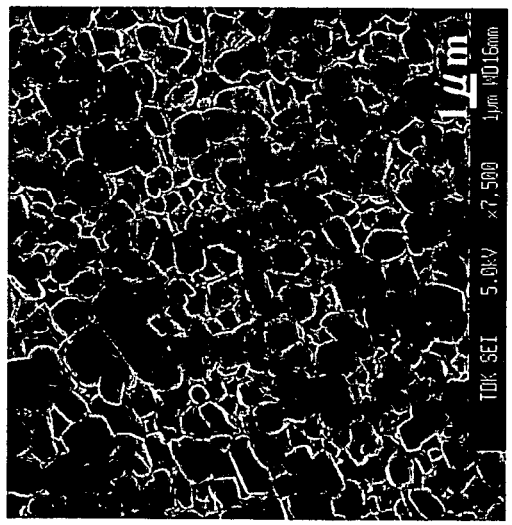
Figure 8A  Sample No. 4 (x=0.26)

Figure 9

| SAMPLE NO. | ELEMENT A | ELEMENT M | x | a | b | 4πIs (G) | Br (G) | SQUARENESS (%) | DENSITY (%) | MAGNETIC ORIENTATION (%) |
|---|---|---|---|---|---|---|---|---|---|---|
| 1 | Sr | NONE | 0 | 2.01 | 16.1 | 4980 | 4522 | 92.79 | 94.7 | 95.84 |
| 9 | Sr | Zn | 0.375 | 1.7 | 13.9 | 5462 | 4962 | 92.18 | 94.9 | 95.77 |
| 10 | Sr | Zn | 0.375 | 1.8 | 12.6 | 5484 | 5029 | 90.77 | 94.8 | 96.77 |
| 11 | Sr, Ba | Zn | 0.375 | 1.75 | 13.35 | 5458 | 5010 | 91.45 | 95.3 | 96.29 |

Figure 10

| SAMPLE NO. | ELEMENT M | x | a | b | 4πIs (G) | Br (G) | SQUARENESS (%) | DENSITY (%) | MAGNETIC ORIENTATION (%) |
|---|---|---|---|---|---|---|---|---|---|
| 1 | NONE | 0 | 2.01 | 16.1 | 4980 | 4522 | 92.79 | 94.7 | 95.84 |
| 12 | Co | 0.125 | 1.98 | 15.9 | 5023 | 4534 | 90.11 | 94.9 | 95.07 |
| 13 | Co | 0.25 | 1.98 | 15.8 | 5032 | 4504 | 90.33 | 94.5 | 94.68 |
| 14 | Co | 0.5 | 1.99 | 15.9 | 5040 | 4232 | 91.03 | 92.7 | 90.58 |
| 15 | Mn | 0.125 | 1.98 | 15.9 | 5048 | 4541 | 90.65 | 94.6 | 95.07 |
| 16 | Ni | 0.125 | 1.99 | 15.9 | 5009 | 4519 | 90.34 | 94.4 | 95.60 |

FERRITE MAGNET POWDER, SINTERED MAGNET, BOND MAGNET, AND MAGNETIC RECORDING MEDIUM

TECHNICAL FIELD

The present invention relates to a technique of improving the magnetic properties of hard ferrite materials, in particular, a W-type hexagonal ferrite magnet.

BACKGROUND ART

A magnetoplumbite-type hexagonal ferrite including $SrO.6Fe_2O_3$ as a representative example, that is, an M-type ferrite, has previously remained a mainstream of ferrite sintered magnets. With regard to such an M-type ferrite magnet, efforts have been made to achieve a higher performance thereof, centering on the purposes that the grain size of a ferrite crystal is brought close to that of a single domain, that ferrite grains are aligned in a magnetic anisotropic direction, and that a high-density sintered body is achieved. As a result of such efforts, the properties of an M-type ferrite magnet are close to its upper limit. Thus, it is difficult to make a dramatic improvement of magnetic properties under the present circumstances.

W-type ferrite magnet has been known as a ferrite magnet, which possibly has magnetic properties that are far superior to those of the M-type ferrite magnet. W-type ferrite magnet has a saturation magnetization ($4\pi Is$) that is approximately 10% higher than that of the M-type ferrite magnet, and has the same level of anisotropic magnetic field as that of the M-type ferrite magnet. National Publication of International Patent Application No. 2000-501893 discloses a W-type ferrite magnet consisting of a composition represented by the composition formula $SrO.2(FeO).n(Fe_2O_3)$, wherein n is between 7.2 and 7.7, and a sintered body thereof has a mean grain size of 2 μm or less and (BH) max of 5 MGOe or more. The aforementioned publication also describes that this W-type ferrite magnet is produced by steps consisting of (1) mixing $SrO_3$ and $Fe_2O_3$ at a certain molar ratio, (2) adding C to the raw material powders, (3) calcining the mixture, (4) adding CaO, $SiO_2$, and C to the resultant product respectively after the calcination, (5) milling the mixture resulting in a mean particle size of 0.06 μm or less, (6) compacting the obtained milled powders in a magnetic field, and (7) sintering the compacted body in a nonoxidative atmosphere.

Japanese Patent Laid-Open No. 2001-85210 discloses that a sintered magnet is comprised of a composite material formed by mixing one or two types of magnetite phases with a W-type ferrite phase, so as to obtain a ferrite sintered magnet having magnetic properties that are superior to those of a conventional M-type ferrite.

The aforementioned National Publication of International Patent Application No. 2000-501893 gives examples showing the achievement of a ferrite magnet having a saturation magnetization $4\pi Is$ of 5.0 kG. However, a ferrite magnet having a higher saturation magnetization $4\pi Is$ has still been required.

On the other hand, the aforementioned Japanese Patent Laid-Open No. 2001-85210 gives examples showing the achievement of ferrite magnets having a high residual magnetic flux density Br of 5.22 kG, 5.12 kG, or 5.06 kG. Japanese Patent Laid-Open No. 2001-85210 does not include any explicit descriptions regarding saturation magnetization $4\pi Is$. In general, residual magnetic flux density Br is calculated in accordance with the expression "residual magnetic flux density Br=saturation magnetization $4\pi Is \times$ magnetic orientation×density." (It is to be noted that saturation magnetization $4\pi Is$ is calculated in accordance with the above expression in the present invention.) Accordingly, based on a conversion from the value of the residual magnetic flux density Br described in Japanese Patent Laid-Open No. 2001-85210, it is assumed that a saturation magnetization $4\pi Is$ of 5.44 kG or more was obtained in this publication. However, in Japanese Patent Laid-Open No. 2001-85210, such a high residual magnetic flux density Br was obtained in a mixed phase comprising a W-type ferrite phase and a magnetite phase (saturation magnetization $4\pi Is=6.0$ kG). Taking into consideration the fact that such a magnetite phase is a soft magnetic phase, the method described in Japanese Patent Laid-Open No. 2001-85210 affects the squareness of a demagnetization curve in a BH curve. Squareness is also an important factor for magnets. Accordingly, even if a residual magnetic flux density Br and a saturation magnetization $4\pi Is$ are improved, it is considered that those having a low squareness are low in terms of magnetic properties that can actually be exerted.

Thus, it is an object of the present invention to provide a hard ferrite material or the like, which exhibits a high saturation magnetization $4\pi Is$ and a high residual magnetic flux density Br without impairing a squareness that is required for magnets.

DISCLOSURE OF THE INVENTION

The present inventors have conducted various studies direct towards achieving the aforementioned object. The inventors have attempted to obtain a hard ferrite material, which exhibits a saturation magnetization $4\pi Is$ and a residual magnetic flux density Br that are higher than those of conventional ferrite materials. As a result, the inventors have found that the partial substitution of the $Fe^{2+}$ site of a W-type ferrite with a specific element such as Zn within a certain range is extremely effective for obtaining a high saturation magnetization $4\pi Is$ and a high residual magnetic flux density Br without impairing squareness. That is to say, the present invention relates to a ferrite magnet powder represented by the composition formula $AFe^{2+}_{a(1-x)}M_{ax}Fe^{3+}_{b}O_{27}$, wherein A represents at least one element selected from the group consisting of Sr, Ba, and Pb; and M represents at least one element selected from the group consisting of Zn, Co, Mn, and Ni, characterized in that $0.05 \leq x \leq 0.80$, $1.5 \leq a \leq 2.2$, and $12 \leq b \leq 17$. In the ferrite magnet powder of the present invention, a crystal phase identified by X-ray diffraction comprises a W phase as a main phase. Herein, when the molar ratio of a W phase calculated from X-ray diffraction intensity is 50% or more in the present invention, it is determined that the W phase is a main phase. The ferrite magnet powder of the present invention enables the comprising of a W phase at a ratio of 90% or more, or also enables the comprising of a W phase as a single phase. It is to be noted that the comprising of a W phase as a single phase means that the molar ratio of the W phase is found to be almost 100%.

In the above described composition formula, regarding x, $0.1 \leq x \leq 0.70$ is preferable. In addition, regarding a, $1.7 \leq a \leq 2.2$ is preferable, and regarding b, $14 \leq b \leq 17$ is desired.

Moreover, in terms of magnetic properties, it is preferable to select Zn as the M.

The ferrite magnet powder of the present invention has excellent properties such as a saturation magnetization of 5.0 kG or more, and preferably 5.1 kG or more.

Furthermore, the present invention provides a sintered magnet represented by the composition formula $AFe^{2+}_{a(1-x)}$ $M_{ax}Fe^{3+}{}_bO_{27}$, wherein A represents at least one element selected from the group consisting of Sr, Ba, and Pb; and M represents at least one element selected from the group consisting of Zn, Co, Mn, and Ni, characterized in that $0.05 \leq x \leq 0.80$, $1.5 \leq a \leq 2.2$, and $12 \leq b \leq 17$.

Still further, the present invention provides a sintered magnet comprising, at a molar ratio of 50% or more, a W-type hexagonal ferrite comprising an element A, wherein A represents at least one element selected from the group consisting of Sr, Ba, and Pb, $Fe^{2+}$, and $Fe^{3+}$, characterized in that the $Fe^{2+}$ site of the above described W-type hexagonal ferrite is partially substituted with an element M, wherein M represents at least one element selected from the group consisting of Zn, Co, Mn, and Ni. These sintered magnets exhibit excellent properties such as a saturation magnetization of 5.0 kG or more, and preferably 5.1 kG or more.

The sintered magnet of the present invention has a saturation magnetization of 5.0 kG or more and a squareness of 80% or more.

In addition, the sintered magnet of the present invention has a saturation magnetization of 5.0 kG or more and a residual magnetic flux density of 4.2 kG or more.

In the sintered magnet of the present invention, the element M is preferably Zn.

Moreover, in the sintered magnet of the present invention, the element A is preferably Sr, and it may also be possible to use Sr and Ba in combination.

Furthermore, the present invention provides a bonded magnet characterized in that the bonded magnet comprises: a ferrite magnet powder represented by the composition formula $AFe^{2+}{}_{a(1-x)}M_{ax}Fe^{3+}{}_bO_{27}$, wherein A represents at least one element selected from the group consisting of Sr, Ba, and Pb; and M represents at least one element selected from the group consisting of Zn, Co, Mn, and Ni, and wherein $0.05 \leq x \leq 0.80$, $1.5 \leq a \leq 2.2$, and $12 \leq b \leq 17$; and a resin phase that disperses and retains the above described ferrite magnetic power.

Still further, the present invention provides a magnetic recording medium comprising a substrate and a magnetic layer formed on the above described substrate. The term "magnetic recording medium" is used herein to include a wide range of magnetic recording media. Examples of such a magnetic recording medium include thin film-type magnetic recording media such as a magnetic head or flexible disk, and coating-type magnetic recording media such as a magnetic tape. In the present invention, the above described magnetic layer has a ferrite structure represented by the composition formula $AFe^{2+}{}_{a(1-x)}M_{ax}Fe^{3+}{}_bO_{27}$, wherein A represents at least one element selected from the group consisting of Sr, Ba, and Pb; and M represents at least one element selected from the group consisting of Zn, Co, Mn, and Ni, and the above described composition formula is set in the range of $0.05 \leq x \leq 0.80$, $1.5 \leq a \leq 2.2$, and $12 \leq b \leq 17$. In the magnetic recording medium of the present invention, the above described magnetic layer has a saturation magnetization of 5.2 kG or more.

In the magnetic recording medium of the present invention, it is preferable that Zn be selected as M, and the above described magnetic layer are set to have a saturation magnetization of 5.2 kG or more and a residual magnetic flux density of 4.5 kG or more.

BRIEF DESCRIPTION OF THE DRAWINGS

FIG. 2 is a table showing the compositions and magnetic properties of the sintered bodies obtained in Example 1;

FIG. 4 is a graph showing the relationship between a Zn substitution ratio and a residual magnetic flux density Br;

FIG. 7 is a table showing the results of quantitative analysis that was performed on sample No. 1 and sample No. 4 in accordance with the fluorescent X-ray quantitative analysis method;

FIG. 8A is a scanning electron micrograph showing the grain structure of sample No. 4;

FIG. 8B is a scanning electron micrograph showing the grain structure of sample No. 6;

FIG. 8C is a scanning electron micrograph showing the grain structure of sample No. 8;

FIG. 9 is a table showing the compositions and magnetic properties of the sintered bodies obtained in Example 2; and FIG. 10 is a table showing the compositions and magnetic properties of the sintered bodies obtained in Example 3.

BEST MODE FOR CARRYING OUT THE INVENTION

Figure 1:
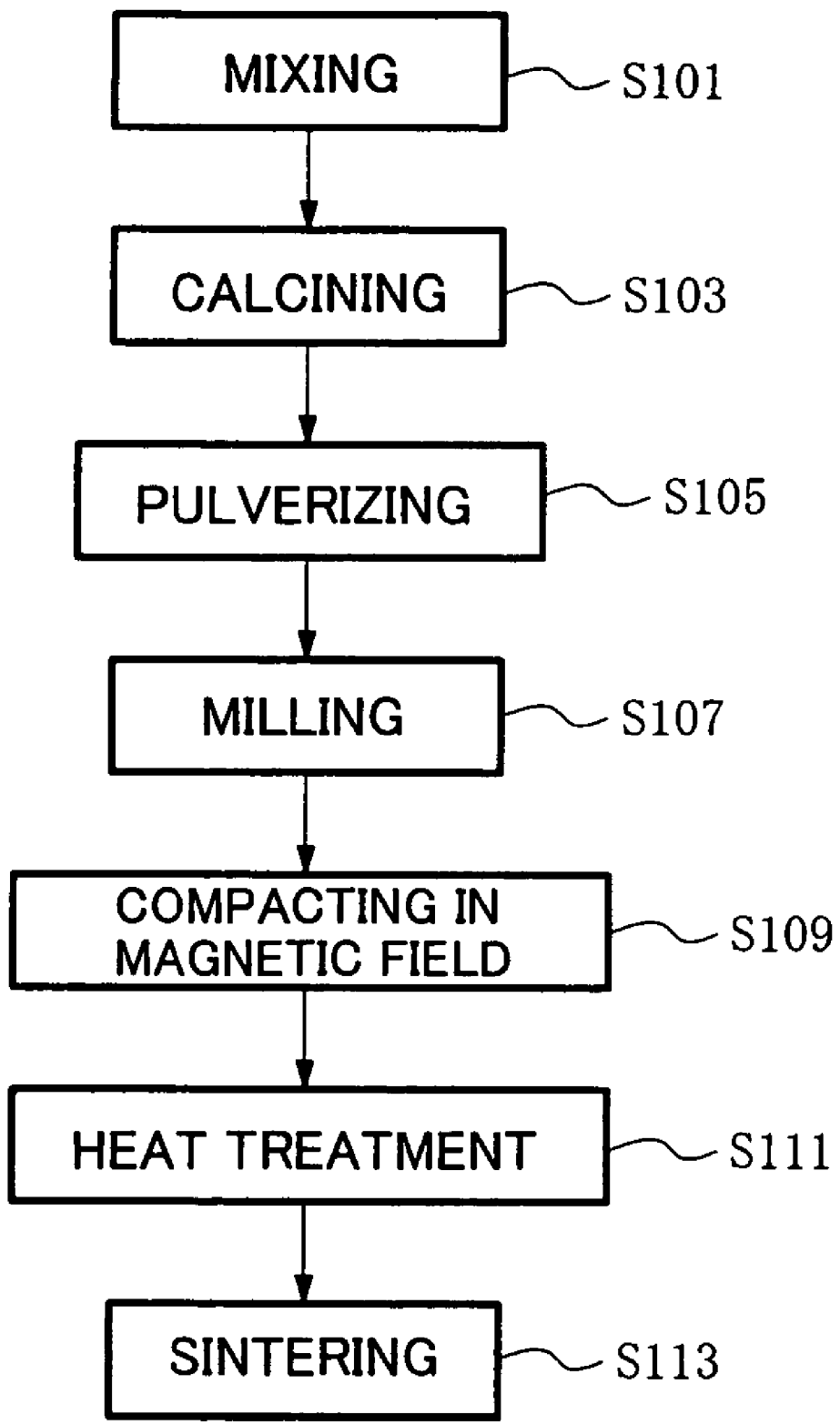
FIG. 1 is a flow chart showing a production method of the sintered magnet of the present invention.

The ferrite magnet powder of the present invention will be described in detail below.

W-type ferrite includes a Zn—W-type ferrite and a Fe—W-type ferrite. The Zn—W-type ferrite comprising Zn in the composition thereof exhibits a residual magnetic flux density Br that is higher than that of the Fe—W-type ferrite. In addition, since the Zn—W-type ferrite can be sintered in the ambient air, it is advantageous in terms of easy mass production. However, since the anisotropic magnetic field of the Zn—W-type ferrite is low, it is problematic in terms of low coercive force Hcj. In order to solve this problem thereby obtaining a W-type ferrite with high properties, the present invention proposes the partial substitution of the $Fe^{2+}$ site of a Fe—W-type ferrite comprising $Fe^{2+}$ in the composition thereof with element M such as Zn. By partially substituting the $Fe^{2+}$ site of a Fe—W-type ferrite with element M such as Zn, a novel W-type ferrite having high magnetic properties, and in particular, exhibiting a high saturation magnetization $4\pi Is$ and a high residual magnetic flux density Br can be obtained.

In the present invention, when the molar ratio of a W phase is 50% or more, it is determined that the W phase is a main phase. From the viewpoint of magnetic properties, the molar ratio of the W phase is 90% or more, preferably 95% or more, more preferably 99% or more, and furthermore preferably almost 100% (single W phase). The molar ratio in the present application is measured by mixing powder samples of W-type ferrite, M-type ferrite, hematite, and spinel at a certain ratio, and then calculating by the comparison of the X-ray diffraction intensities thereof (the molar ratio was measured in this manner also in examples given later).

The present inventors have conducted various studies in order to obtain magnetic properties that are higher than those of the conventional single W phase (or a W phase as a main phase). As a result, the inventors have found that the partial substitution of the $Fe^{2+}$ site thereof with element M such as Zn is extremely effective, as shown in formula (1) indicated below. Such substitution enables the achievement of a W-type ferrite having both a high saturation magnetization $4\pi Is$ and a high residual magnetic flux density Br, while keeping the W phase to be a single phase (or comprising the W phase as a main phase).

$$AFe^{2+}_{a(1-x)}M_{ax}Fe^{3+}_{b}O_{27} \qquad \text{Formula (1)}$$

wherein, $0.05 \leq x \leq 0.80$, $1.5 \leq a \leq 2.2$, and $12 \leq b \leq 17$.

In addition, in the above formula (1), A is at least one element selected from the group consisting of Sr, Ba, and Pb.

At least one selected from the group consisting of Sr and Ba is preferable as A. In terms of magnetic properties, Sr is particularly preferable. Moreover, the combined use of Sr with Ba is effective for improving a residual magnetic flux density Br. It is to be noted that each of a(1-x), ax, and b represents a molar ratio in the above formula (1).

Next, limitation reasons for x, a, and b in formula (1) will be described.

The symbol x indicates the amount of element M such as Zn that substitutes for the $Fe^{2+}$ site. The range of x is determined to be $0.05 \leq x \leq 0.80$. The partial substitution of the $Fe^{2+}$ site with element M such as Zn within the above range enables the improvement of a saturation magnetization $4\pi Is$ and a residual magnetic flux density Br. If x is less than 0.05, the effects obtained by the substitution are not sufficient. On the other hand, as the substitution amount increases, the saturation magnetization $4\pi Is$ and the residual magnetic flux density Br are gradually improved. However, both the saturation magnetization $4\pi Is$ and the residual magnetic flux density Br have their peak values when x is around 0.5. If x exceeds 0.80, the residual magnetic flux density Br returns to almost the same value as that obtained before substitution with element M. Accordingly, the range of x is determined to be $0.05 \leq x \leq 0.80$. The range of x is preferably $0.10 \leq x \leq 0.70$, and more preferably $0.30 \leq x \leq 0.70$.

The symbol a also has effects on the amount of element M that substitutes for the $Fe^{2+}$ site, as with the aforementioned x. The range of a is determined to be $1.5 \leq a \leq 2.2$. If a is less than 1.5, an M phase and a $Fe_2O_3$ (hematite) phase, the saturation magnetization $4\pi Is$ of which is lower than that of the W phase, are generated, thereby resulting in a decrease in the saturation magnetization $4\pi Is$. In contrast, if a exceeds 2.2, a spinel phase is generated, thereby resulting in a decrease in the coercive force Hcj. Accordingly, the range of a is determined to be $1.5 \leq a \leq 2.2$. The range of a is preferably $1.7 \leq a \leq 2.2$, more preferably $1.8 \leq a \leq 2.1$, and further more preferably $1.9 \leq a \leq 2.1$.

The symbol b indicates the ratio of $Fe^{3+}$. The range of b is determined to be $12 \leq b \leq 17$. If b is less than 12, a spinel phase is generated, thereby resulting in a decrease in the coercive force Hcj. In contrast, if b exceeds 17, an M phase and a $Fe_2O_3$ (hematite) phase are generated, thereby resulting in a decrease in the saturation magnetization $4\pi Is$. Accordingly, the range of b is determined to be $12 \leq b \leq 17$. The range of b is preferably $14 \leq b \leq 17$, more preferably $15 \leq b \leq 17$, and further more preferably $15.5 \leq b \leq 17$.

The composition of a ferrite magnet powder can be measured by fluorescent X-ray quantitative analysis or the like. In addition, the comprising of elements other than element A (at least one element selected from the group consisting of Sr, Ba, and Pb), Fe, and element M (at least one element selected from the group consisting of Zn, Co, Mn, and Ni) is not excluded from the present invention. Elements other than the aforementioned elements, such as Si or Ca, may also be comprised.

The ferrite magnet powder of the present invention is described in detail above. The ferrite magnet powder of the present invention can be used as either a bonded magnet or a sintered magnet. Accordingly, the aforementioned ferrite magnet powder of the present invention includes all of forms such as a calcined powder, a powder obtained by milling after subjecting to calcining and sintering, and a powder heat treated after subjecting to calcining and milling.

When the ferrite magnet powder of the present invention is used as a bonded magnet, the mean particle size is preferably set between 0.1 and 5 µm. The mean particle size of a powder used as a bonded magnet is more preferably between 0.1 and 2 µm, and further more preferably between 0.1 and 1 µm. On the other hand, when the ferrite magnet powder of the present invention is used as a sintered magnet, the mean particle size is preferably set between 0.1 and 2 µm. The mean particle size of a powder used as a sintered magnet is more preferably between 0.1 and 1 µm, and further more preferably between 0.1 and 0.8 µm. The details will be described later, but when a sintered magnet is produced using the ferrite magnet powder of the present invention, a saturation magnetization $4\pi Is$ of 5.1 kG or more and a residual magnetic flux density Br of 4.5 kG or more can be obtained. Thus, since the ferrite magnet powder of the present invention has a residual magnetic flux density Br that is higher than those of the conventional magnet powders, the effects mentioned below can be obtained by the application of this ferrite magnet powder, thereby obtaining excellent products, generally. That is to say, when the ferrite magnet powder of the present invention is processed into the same form as those of the conventional ferrite products, a residual magnetic flux density Br generated from the magnet can be increased. Thus, when the ferrite magnet powder of the present invention is applied to a motor, the motor has a high torque, and if it is applied to a speaker or headphone, a sound quality with good linearity can be obtained by the reinforcement of a magnet circuit. Hence, the ferrite magnet powder of the present invention contributes to the technical advantages of such applied products. In addition, even in a case where only the same level of functions as those of the conventional products are required, the ferrite magnet powder of the present invention enables a reduction (thinning) in the size (thickness) of the magnet, thereby contributing to a reduction in size and weight (thinning).

Next, a method for producing the sintered magnet of the present invention will be explained using FIG. 1. The production method of the sintered magnet of the present invention comprises a mixing step (step S101), a calcining step (step S103), a pulverizing step (step S105), a milling step (step S107), a compacting step in a magnetic field (step S109), a heat treatment step (step S111), and a sintering step (step S113). Since $Fe^{2+}$ is easily changed to $Fe^{3+}$ in the ambient air, the heat treatment temperature, the sintering atmosphere, and the like are controlled in the production method of the sintered magnet of the present invention, so as to stably control $Fe^{2+}$. Each of the above described steps will be described below.

<Mixing Step (Step S101)>

First, $Fe_2O_3$ (hematite) powders and ZnO powders are prepared. When Sr is selected as element A in the present invention, $SrCO_3$ powders are also prepared. Thereafter, $SrCO_3$ powders, $Fe_2O_3$ (hematite) powders, and ZnO powders are weighed, such that the main composition becomes that as shown in the above described formula (1). After completion of the weighing, these powders are mixed and crushed for 1 to 3 hours using a wet attritor, or the like.

<Calcining Step (Step S103)>

Subsequently, the mixed powder material obtained in the mixing step (step S101) was calcined at a temperature between 1100° C. and 1350° C. By performing such calcination in a nonoxidative atmosphere such as nitrogen gas or argon gas, $Fe^{3+}$ contained in $Fe_2O_3$ (hematite) powders is reduced, and $Fe^{2+}$ constituting a W-type ferrite is thereby generated, so that such a W-type ferrite is constituted. However, if a sufficient amount of $Fe^{2+}$ were not obtained at this stage, an M phase or a hematite phase would exist together with the W phase. In order to obtain a ferrite consisting of a single W phase, the regulation of an oxygen partial pressure is effective. This is because $Fe^{3+}$ is reduced, and $Fe^{2+}$ is thereby generated, when an oxygen partial pressure is decreased.

<Pulverizing Step (Step S105)>

A calcined body generally has a granular form. Thus, such a calcined body is preferably pulverized. In the pulverizing step (step S105), using an agitation mill or the like, a calcined body is pulverized resulting in a mean particle size between 0.5 and 10 µm.

<Milling Step (Step S107)>

Subsequently, in the milling step (step S107), the pulverized powders are subjected to wet or dry milling using such as an attritor, ball mill, or jet mill, resulting in a mean particle size of 1 µm or less, and preferably between 0.1 and 0.8 µm. Addition of carbon powders having reduction effects at this stage is effective for allowing a W-type ferrite to generate in a state that is close to a single phase (or a single phase itself). It may also be possible to add powders such as $CaCO_3$, $SiO_2$, $Al_2O_3$, or $Cr_2O_3$, prior to the milling of the aforementioned pulverized powders, so as to improve the coercive force Hcj or adjust the grain size of the ferrite.

<Compacting Step in a Magnetic Field (Step S109)>

After completion of the milling, wet or dry compacting is carried out. A wet compacting is preferable to increase magnetic orientation. Thus, the case of performing such wet compacting will be explained below.

When wet compacting is adopted, slurry obtained by wet milling is concentrated, so as to prepare slurry used for wet compacting. Such concentration may be carried out by such as centrifugal separator or filter pressing. During this process, ferrite magnet powders are preferably contained in the slurry used for wet compacting at a ratio between 30% and 80% based on the weight of the slurry. In addition, surfactants such as gluconic acid (gluconate) or sorbitol are preferably added to water used as a dispersion medium. Thereafter, the slurry used for wet compacting is subjected to compacting in a magnetic field. A compacting pressure may be set between approximately 0.1 and 0.5 ton/cm², and an applied magnetic field may be set between approximately 5 and 15 kOe. As a dispersion medium, not only water but also nonaqueous media may be used. When a nonaqueous dispersion medium is used, organic solvents such as toluene or xylene can be used. When toluene or xylene is used as a nonaqueous dispersion medium, surfactants such as oleic acid are preferably added.

<Heat Treatment Step (Step S111)>

In this step, a compacted body is subjected to a heat treatment. It is retained at a low temperature between 100° C. and 450° C., and more preferably between 200° C. and 350° C., for 1 to 4 hours. By performing this heat treatment in the ambient air, $Fe^{2+}$ is partially oxidized and thereby converted into $Fe^{3+}$. That is, in the present step, a reaction of converting $Fe^{2+}$ into $Fe^{3+}$ is allowed to progress to a certain extent, so as to regulate the amount of $Fe^{2+}$ to a given amount. Moreover, the aforementioned dispersion medium is removed in the present step.

<Sintering Step (Step S113)>

In the sintering step (step S113), a compacted body is sintered at a temperature between 1100° C. and 1270° C., and more preferably between 1160° C. and 1240° C., for 0.5 to 3 hours. Such sintering is carried out in a nonoxidative atmosphere for the same reason as mentioned in the calcining step (step S103).

By performing the aforementioned steps, the sintered magnet of the present invention can be obtained. The sintered magnet of the present invention that is characterized by the partial substitution of the $Fe^{2+}$ site thereof with element M such as Zn has a saturation magnetization 4πIs of 5.0 kG or more, preferably 5.1 kG or more, and more preferably 5.2 kG or more. Since a saturation magnetization 4πIs is closely related to a residual magnetic flux density Br, with the improvement of the saturation magnetization 4πIs, the residual magnetic flux density Br is also improved, such as Br of 4.5 kG or more, preferably 4.6 kG or more, and more preferably 4.7 kG or more. Moreover, by performing the aforementioned steps, a sintered magnet comprising a W phase as a main phase, or even as a single phase, can be obtained.

A method for producing a sintered magnet is described in detail above. Using the ferrite magnet powder of the present invention, a bonded magnet with high magnetic properties can also be obtained. A method for producing such a bonded magnet will be described below. In the case of producing a bonded magnet also, the mixing step (step S101), the calcining step (step S103), the pulverizing step (step S105), and the milling step (step S107) are carried out in the aforementioned manners. The thus obtained calcined body comprises a W phase as a main phase or a single phase. These ferrite magnet powders are then mixed and kneaded with various binders such as a resin, metal, or rubber. Thereafter, the obtained mixture is compacted in a magnetic or non-magnetic field. Preferred examples of a binder may include an NBR rubber, chlorinated polyethylene, and a polyamide resin. After completion of the compacting, a cure treatment is followed, so as to obtain a bonded magnet. In addition, the ferrite magnet powders are preferably subjected to a heat treatment before being mixed with a binder.

The ferrite magnet powder, sintered body, and bonded magnet of the present invention are described in detail above. A bonded magnet and a sintered magnet that comprise the ferrite magnet powder of the present invention are processed in a certain form, and used in a broad range of purposes, as indicated below. For example, these magnets can be used as car motors for as a fuel pomp, a power window, ABS (antilock break system), a fan, a wiper, a power steering, an active suspension, a starter, a door lock, an electric mirror, or the like. Moreover, these magnets can also be used as motors for office automation or audio-video equipment, which drive an FDD spindle, a VTR capstan, a VTR rotating head, a VTR reel, a VTR loading, a VTR camera capstan, a VTR camera rotating head, a VTR camera zoom, a VTR camera focus, a radio cassette capstan, a CD, LD or MD spindle, a CD, LD or MD loading, or a CD or LD light pickup, or the like. Furthermore, these magnets can also be used as motors for household electrical appliances, which drive an air conditioner compressor, a refrigerator compressor, an electric tool, an electric fan, a microwave oven fan, a microwave oven plate, a mixer, a drier fan, a shaver, or an electric toothbrush, or the like. Still further, these magnets can also be used as motors for factory automation equipment, which drive a robot axis, a joint, a robot, a machine tool table, or a machine tool belt, or the like. For other purposes, these magnets can also preferably be used for a motorcycle generator, a magnet used for speakers or headphones, a magnetron tube, a magnetic field generator for MRI, a CD-ROM clamper, a sensor for distributors, a sensor for ABS, a fuel/oil level sensor, a magnet latch, or the like.

The present invention also includes a magnetic recording medium having a magnetic layer. This magnetic layer comprises a W-type ferrite phase represented by the aforementioned formula (1). Such a magnetic layer is formed by the evaporation method, the sputtering method, etc. When a magnetic layer is formed by the sputtering method, a sintered magnet having the composition represented by the aforementioned formula (1) can also be used as a target, for example. When a coating-type magnetic recording medium is produced, a ferrite magnet powder represented by the aforementioned formula (1) may be mixed and kneaded with a binder, so as to prepare a coating material, and a substrate made of a resin or the like may be coated with the obtained coating material, followed by curing, so as to form a magnetic layer. Examples of a magnetic recording medium may include a magnetic head, a flexible disk, and a magnetic tape, or the like.

EXAMPLES

The present invention will be described further in detail in the following specific examples.

Example 1

An experimental example, in which Zn was selected as element M, will be given below as Example 1.

The sintered magnet of the present invention was produced in accordance with the following procedures.

Figure 3:
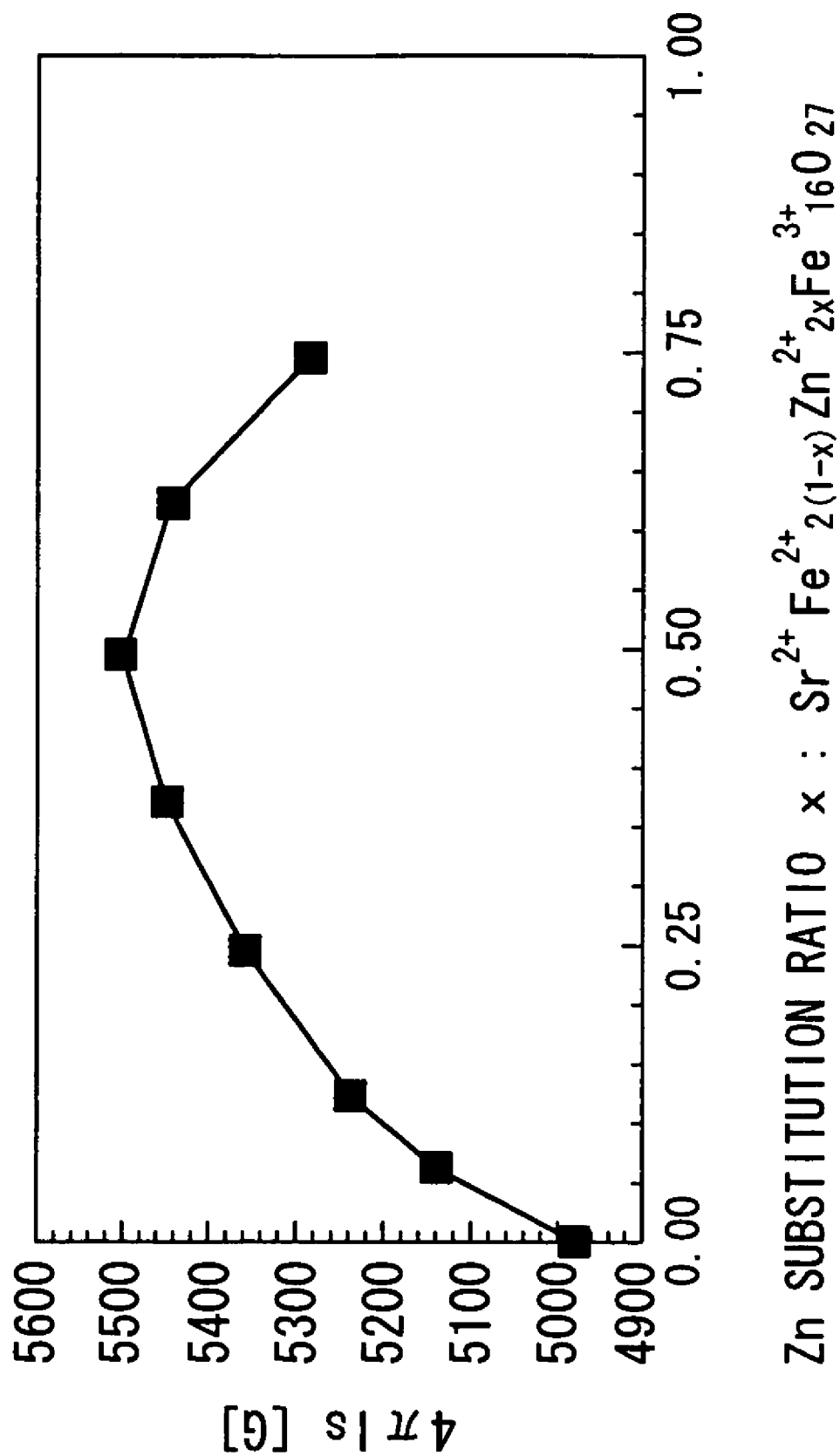
FIG. 3 is a graph showing the relationship between a Zn substitution ratio and a saturation magnetization $4\pi Is$.

$Fe_2O_3$ powders (primary particle size: 0.3 μm), $SrCO_3$ powders (primary particle size: 2 μm), and ZnO powders (primary particle size: 0.3 μm) were prepared as raw material powders. These raw material powders were weighed, resulting in given values. That is, each of the raw material powders was weighed, such that the composition of the finally obtained sintered magnet could be set within the range as shown in formula (1). After completion of the weighing, these powders were mixed and crushed using a wet attritor for 2 hours. Subsequently, the crushed powders were dried, and the particle size thereof was then regulated. Thereafter, the powders were calcined in a nitrogen atmosphere at 1300° C. for 1 hour, so as to obtain a powdery calcined body. 220 g of the calcined body was pulverized with a dry agitation mill for 10 minutes, so as to obtain powders having a mean particle size of 1 μm. Thereafter, 0.6% by weight of $SiO_2$ powders (primary particle size: 0.01 μm), 1.4% by weight of $CaCO_3$ powders (primary particle size: 1 μm), and (0.75-x)/2.5% by weight of carbon powders (primary particle size: 0.05 μm) were added to 210 g of the calcined body. The obtained mixture was then subjected to wet milling with a ball mill for 40 hours. It is to be noted that the amount of calcined powders contained in slurry was 33% by weight. After completion of the milling, the slurry was concentrated in a centrifugal separator, so as to prepare slurry used for wet compacting. This slurry used for wet compacting was then subjected to compacting in a magnetic field. The applied magnetic field (vertical magnetic field) was 12 kOe (1000 kA/m), and the compacted body had a cylindrical form with a diameter of 30 mm and a height of 15 mm. This compacted body was subjected to a heat treatment at 250° C. for 3 hours in the ambient air. The resultant was then sintered in a nitrogen atmosphere at a temperature rising rate of 5° C./minute at the maximum temperature of 1200° C. for 1 hour, so as to obtain 8 types of sintered bodies having the composition represented by the formula $SrFe^{2+}_{a(1-x)}Zn_{ax}Fe^{3+}_{b}O_{27}$ (the values of a, b, and x are shown in FIG. 2). The top and bottom surfaces of each of the obtained sintered bodies were processed. Thereafter, magnetic properties thereof were evaluated in the manner mentioned below, using a BH tracer of which the maximum magnetic field applied was 25 kOe. The results are shown in FIG. 2. The results obtained by the measurement of the saturation magnetization 4πIs and residual magnetic flux density Br are shown in FIGS. 3 and 4, respectively. FIG. 2 also shows density and magnetic orientation.

FIGS. 2 and 3 show that the saturation magnetization 4πIs was improved, as the value of x, that is, the Zn substitution ratio increased. However, after x exceeded 0.5, the saturation magnetization 4πIs gradually decreased. When x reached 0.74, the saturation magnetization 4πIs returned to almost the same value as that obtained when x was 0.26. Accordingly, x is preferably set at 0.8 or less.

FIG. 4 shows that the residual magnetic flux density Br has the same tendency as the saturation magnetization 4πIs with the exception that the peak value thereof is around 0.4.

From these results, it was found that in order to improve the saturation magnetization 4πIs and the residual magnetic flux density Br, it is effective that the value of x that indicates a Zn substitution ratio be set at 0.8 or less, and more preferably between 0.05 and 0.75. In addition, from the fact that when x was within the range between 0.1 and 0.7, a saturation magnetization 4πIs of 5200 G (5.2 kG) or more and a residual magnetic flux density Br of 4600 G (4.6 kG) or more could be obtained, it was found that the value of x is further more preferably between 0.1 and 0.7. Moreover, taking into consideration the value of "squareness" shown in FIG. 2, it was also found that even if the $Fe^{2+}$ site is partially substituted with Zn, a good squareness (90% or more) can be obtained.

Figure 5A:
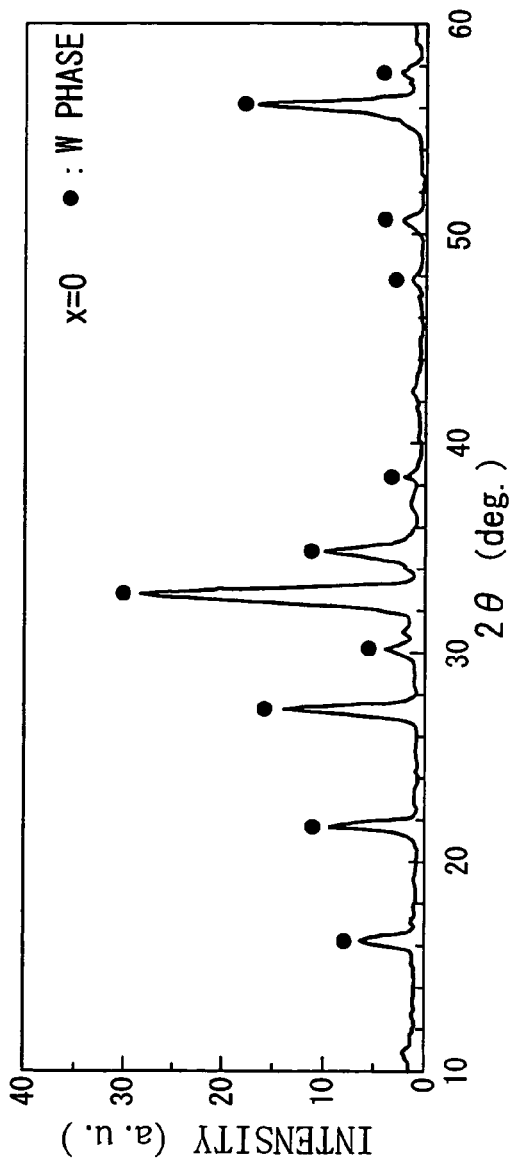
FIG. 5A is a graph showing the results of X-ray diffraction obtained when x=0.
Figure 5B:
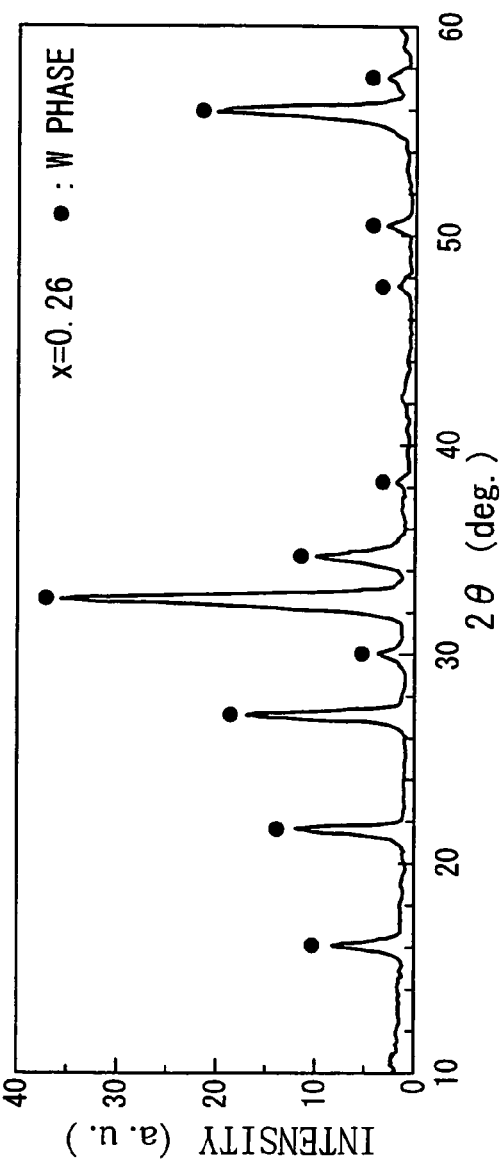
FIG. 5B is a graph showing the results of X-ray diffraction obtained when x=0.26.
Figure 6A:
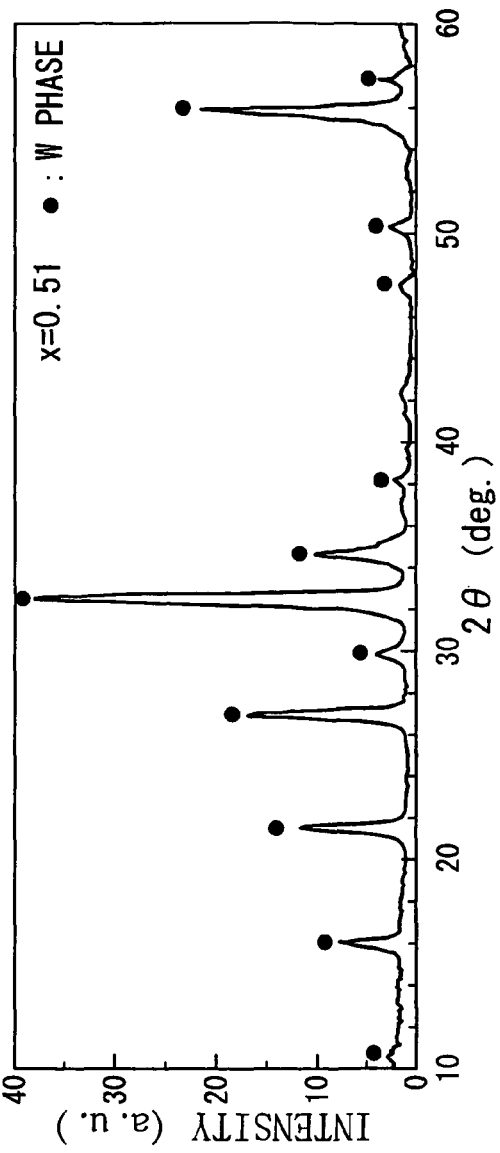
FIG. 6A is a graph showing the results of X-ray diffraction obtained when x=0.51.
Figure 6B:
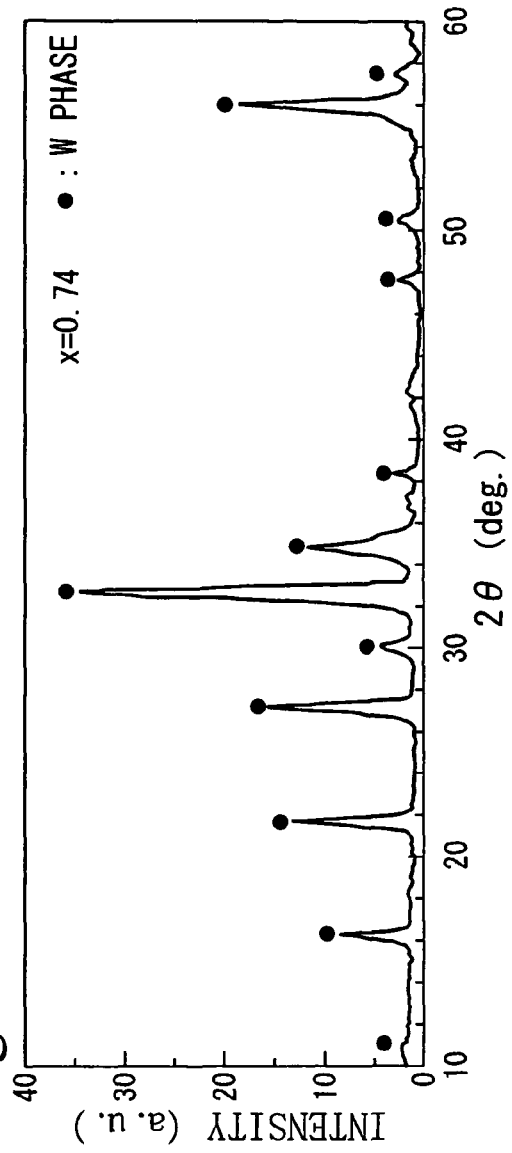
FIG. 6B is a graph showing the results of X-ray diffraction obtained when x=0.74.

FIGS. 5 and 6 show the results obtained by identifying the phase states of sample Nos. 1, 4, 6, and 8, using an X-ray diffraction device. The following conditions were applied to the X-ray diffraction:

X-ray generator: 3 kW
Tube voltage: 45 kV
Tube current: 40 mA
Sampling width: 0.02 deg
Scanning speed: 4.00 deg/min
Divergence slit: 1.00 deg
Scattering slit: 1.00 deg
Receiving slit: 0.30 mm From the X-ray diffraction shown in FIGS. 5 and 6, it was confirmed that samples Nos. 1, 4, 6, and 8 were all single W phases, that is, the molar ratio of the W phase was almost 100%. In other words, it was confirmed that samples Nos. 4, 6, and 8, in which the $Fe^{2+}$ site thereof had been partially substituted with Zn, could also maintain single W phases. As publicly known, since the W-type ferrite is a hard ferrite, a sintered body sample consisting of a single W phase naturally also has good squareness in terms of the BH curve.

FIG. 7 shows the results of quantitative analysis that was performed on sample No. 1 and sample No. 4 in accordance with the fluorescent X-ray quantitative analysis method. The figure shows the results of analyzing the amounts of $Fe_2O_3$, SrO, and ZnO and determining the $Fe^{2+}$ amount by chemical analysis of Fe. The final composition of sample No. 4 was $SrFe^{2+}_{1.47}Zn_{0.51}Fe^{3+}_{16.2}O_{27}$, wherein a=1.98, b=16.2, x=0.26 were applied to formula (1). Taking into consideration the results of the X-ray diffraction showing a single W phase, it is considered that Zn was substituted for the $Fe^{2+}$ site. If Zn was not incorporated into a part of the $Fe^{2+}$ site, that is, if a part of the $Fe^{2+}$ site was not substituted with Zn, it would mean that hetero-phases other than the W phase are generated.

Subsequently, the grain structure of each of sample Nos. 4, 6, and 8 was observed using a scanning electron microscope. FIG. 8 shows photomicrographs. FIGS. 8A, 8B, and 8C show the grain structures of the sintered bodies (sample Nos. 4, 6, and 8), the $Fe^{2+}$ site of which was partially substituted with Zn, respectively. From FIGS. 8A, 8B, and 8C, it is found that fine and uniform structures having a mean grain size of 0.8 μm were obtained.

Example 2

Three types of sintered bodies (sample Nos. 9, 10, and 11) having the composition represented by the formula $AFe^{2+}_{a(1-x)}M_{ax}Fe^{3+}_{b}O_{27}$, wherein the values of a, b, and x are shown in FIG. 9, were produced under the same conditions as those applied in Example 1 with the following exceptions. Thereafter, the magnetic properties of the sintered bodies were evaluated under the same conditions as those applied in Example 1. The results are shown in FIG. 9.

<Sample No. 9>

The following types of additives and additive amounts were determined with respect to 210 g of the calcined body.

$SiO_2$ powders (primary particle size: 0.01 μm) 0.6% by weight
$CaCO_3$ powders (primary particle size: 1 μm) 0.7% by weight
Sorbitol (primary particle size: 10 μm) 1.2% by weight
Carbon powders (primary particle size: 0.05 μm) 0.25% by weight
$SrCO_3$ powders (primary particle size: 2 μm) 1.5% by weight <Sample No. 10>

The following types of additives and additive amounts were determined with respect to 210 g of the calcined body.

$SiO_2$ powders (primary particle size: 0.01 μm) 0.6% by weight
$CaCO_3$ powders (primary particle size: 1 μm) 0.7% by weight
Sorbitol (primary particle size: 10 μm) 1.2% by weight
Carbon powders (primary particle size: 0.05 μm) 0.25% by weight
$SrCO_3$ powders (primary particle size: 2 μm) 2.4% by weight <Sample No. 11>

Sr and Ba were selected as element A. $Fe_2O_3$ powders (primary particle size: 0.3 μm), $SrCO_3$ powders (primary particle size: 2 μm), and $BaCO_3$ powders (primary particle size: 2 μm) were prepared as raw material powders. These raw material powders were weighed, and then mixed and crushed using a wet attritor for 2 hours, so as to obtain a calcined body under the same conditions as those applied in Example 1.

Thereafter, the following types of additives and additive amounts were determined with respect to 210 g of the calcined body, and a sintered body having the composition represented by the formula $AFe^{2+}_{a(1-x)}M_{ax}Fe^{3+}_{b}O_{27}$ was produced in accordance with the same procedures as applied in Example 1. The ratio of Sr to Ba was indicated with Sr:Ba=0.67:0.33 in the obtained sintered body.

$SiO_2$ powders (primary particle size: 0.01 μm) 0.6% by weight
$CaCO_3$ powders (primary particle size: 1 μm) 0.35% by weight
Sorbitol (primary particle size: 10 μm) 1.2% by weight
Carbon powders (primary particle size: 0.05 μm) 0.25% by weight
$BaCO_3$ powders (primary particle size: 2 μm) 1.4% by weight
$SrCO_3$ powders (primary particle size: 2 μm) 0.7% by weight As shown in FIG. 9, all of sample Nos. 9 to 11 had a 4πIs of 5400 G (5.4 kG) or more, a residual magnetic flux density Br of 4900 G (4.9 kG) or more, and a squareness of 90% or more. From these results, it was found that the addition of $SrCO_3$ powders as well as sorbitol during the milling step is effective for obtaining high magnetic properties.

In addition, from the comparison of the magnetic properties of sample No. 11, wherein Sr and Ba were selected as element A, with those of sample Nos. 9 and 10, wherein only Sr was selected as element A, it was confirmed that even when Ba is selected as element A, the same effects as those of Sr can be obtained.

Moreover, the phase states of sample Nos. 9 to 11 were identified under the same conditions as those applied in Example 1. As a result, it was confirmed that the molar ratio of a W phase was between 70% and 100%.

Example 3

An experimental example, in which Co, Mn, and Ni were selected as element M, will be given below as Example 3.

Five types of sintered bodies having the composition represented by the formula $SrFe^{2+}_{a(1-x)}M_{ax}Fe^{3+}_{b}O_{27}$, wherein the values of a, b, and x are shown in FIG. 10, were produced in accordance with the same procedures as those applied in Example 1. Thereafter, the magnetic properties of the sintered bodies were evaluated under the same conditions as those applied in Example 1. The results are shown in FIG. 10. FIG. 10 also shows density and magnetic orientation.

As shown in FIG. 10, even when the $Fe^{2+}$ site was partially substituted with any one of Co, Mn, and Ni, the sintered body had a 4πIs that was higher than sample No. 1 that had not been substituted, while exhibiting a good squareness of 90% or more.

In addition, the phase states of sample Nos. 12 to 16 were identified under the same conditions as those applied in Example 1. As a result, it was confirmed that the molar ratio of a W phase was between 70% and 100%.

INDUSTRIAL APPLICABILITY

The present invention provides a hard ferrite material or the like, which has both a high saturation magnetization 4πIs and a high residual magnetic flux density Br, without impairing squareness that is required for magnets.

The invention claimed is:

1. A ferrite magnet powder represented by the composition formula $AFe^{2+}_{a(1-x)}M_{ax}Fe^{3+}_{b}O_{27}$, wherein A represents at least one element selected from the group consisting of Sr, Ba, and Pb; and M represents at least one element selected from the group consisting of Zn, Co, Mn, and Ni,
characterized in that $0.30 \leq x \leq 0.70$,
$1.5 \leq a \leq 2.2$,
$12 \leq b \leq 17$, and
the ferrite magnet powder has a saturation magnetization of 5.0 kG or more.

2. The ferrite magnet powder according to claim 1 characterized in that a crystal phase identified by X-ray diffraction comprises a W phase as a main phase.

3. The ferrite magnetic powder according to claim 1, characterized in that $1.7 \leq a \leq 2.2$ in said composition formula.

4. The ferrite magnetic powder according to claim 1, characterized in that $14 \leq b \leq 17$ in said composition formula.

5. The ferrite magnetic powder according to claim 1, characterized in that said M is Zn.

6. The ferrite magnet powder according to claim 1, characterized in that said ferrite magnet powder has a saturation magnetization of 5.1 kG or more.

7. A sintered magnet represented by the composition formula $AFe^{2+}_{a(1-x)}M_{ax}Fe^{3+}_{b}O_{27}$, wherein A represents at least one element selected from the group consisting of Sr, Ba, and Pb; and M represents at least one element selected from the group consisting of Zn, Co, Mn, and Ni, characterized in that $0.30 \leq x \leq 0.70$,
$1.5 \leq a \leq 2.2$,
$12 \leq b \leq 17$, and
the sintered magnet has a saturation magnetization of 5.0 kG or more.

8. The sintered magnet according to claim 7, characterized in that said sintered magnet has a saturation magnetization of 5.1 kG or more.

9. The sintered magnet according to claim 7, characterized in that said sintered magnet has a squareness of 80% or more.

10. The sintered magnet according to claim 7, characterized in that said sintered magnet has a residual magnetic flux density of 4.2 kG more.

11. The sintered magnet according to claim 7, characterized in that said element M is Zn.

12. The sintered magnet according to claim 7, characterized in that said element A is Sr.

13. The sintered magnet according to claim 7, characterized in that said element A is Sr and Ba.

14. A bonded magnet comprising:
a ferrite magnet powder represented by the composition formula $AFe^{2+}_{a(1-x)}M_{ax}Fe^{3+}_{b}O_{27}$, wherein A represents at least one element selected from the group consisting of Sr, Ba, and Pb; and M represents at least one element selected from the group consisting of Zn, Co, Mn, and Ni, and wherein $0.30 \leq x \leq 0.70$, $1.5 \leq a \leq 2.2$, and $12 \leq b \leq 17$: and a resin phase that disperses and retains said ferrite magnet powder, and the bonded magnet has a saturation magnetization of 5.0 kG or more.

15. A magnetic recording medium comprising a substrate and a magnetic layer formed on said substrate,
characterized in that said magnetic layer has a ferrite structure represented by the composition formula $AFe^{2+}_{a(1-x)}M_{ax}Fe^{3+}_{b}O_{27}$, wherein A represents at least one element selected from the group consisting of Sr, Ba, and Pb; and M represents at least one element selected from the group consisting of Zn, Co, Mn, and Ni,
and wherein $0.30 \leq x \leq 0.70$, $1.5 \leq a \leq 2.2$, $12 \leq b \leq 17$, and
the magnetic layer has a saturation magnetization of 5.0 kG or more.

16. The magnetic recording medium according to claim 15, characterized in that said magnetic layer has a saturation magnetization of 5.2 kG or more.

17. The magnetic recording medium according to claim 15, characterized in that said M is Zn and said magnetic layer has a saturation magnetization of 5.2 kG or more and a residual magnetic flux density of 4.5 kG or more.

* * * * *